(12) United States Patent
Durant et al.

(10) Patent No.: US 9,487,423 B1
(45) Date of Patent: Nov. 8, 2016

(54) PARTIALLY DECARBOXYLATED POLYCARBOXYLIC ACID POLYMERS

(71) Applicant: Itaconix Corporation, Stratham, NH (US)

(72) Inventors: Yvon Durant, Lee, NH (US); Brian Luthi, Stratham, NH (US); John Shaw, Hampton Falls, NH (US)

(73) Assignee: Itaconix Corporation, Stratham, NH (US)

( * ) Notice: Subject to any disclaimer, the term of this patent is extended or adjusted under 35 U.S.C. 154(b) by 0 days.

(21) Appl. No.: 14/855,974

(22) Filed: Sep. 16, 2015

Related U.S. Application Data

(60) Provisional application No. 62/201,015, filed on Aug. 4, 2015.

(51) Int. Cl.
*C08F 22/02* (2006.01)
*C02F 5/10* (2006.01)

(52) U.S. Cl.
CPC ............ *C02F 5/10* (2013.01); *C08F 22/02* (2013.01); *C02F 2303/22* (2013.01)

(58) Field of Classification Search
USPC ...................................... 526/318.2; 524/556
See application file for complete search history.

(56) References Cited

U.S. PATENT DOCUMENTS

| | | | | |
|---|---|---|---|---|
| 3,055,873 | A * | 9/1962 | Hull | C08F 22/16 525/329.5 |
| 3,444,143 | A * | 5/1969 | Tate | C08F 8/00 521/30 |
| 5,223,592 | A | 6/1993 | Hughes et al. | |
| 5,336,744 | A | 8/1994 | Swift et al. | |
| 7,910,676 | B2 | 3/2011 | Durant et al. | |
| 2014/0259439 | A1 * | 9/2014 | Paddock | C14C 3/22 8/94.33 |
| 2015/0183978 | A1 * | 7/2015 | Vince | C08L 35/00 524/549 |

FOREIGN PATENT DOCUMENTS

EP            0659771      6/1995
EP           659771 A1 *  6/1995

\* cited by examiner

*Primary Examiner* — Peter D Mulcahy
*Assistant Examiner* — Henry Hu
(74) *Attorney, Agent, or Firm* — Grossman, Tucker, Perreault & Pfleger, PLLC

(57) ABSTRACT

The present invention relates to partial decarboxylation of polyitaconic acid polymers or copolymers. The partially decarboxylated resins are suitable for use in preparation of dispersions as well as for anti-scaling applications.

9 Claims, 4 Drawing Sheets

US 9,487,423 B1

PARTIALLY DECARBOXYLATED POLYCARBOXYLIC ACID POLYMERS

CROSS REFERENCE TO RELATED APPLICATIONS

This application claims the benefit of U.S. Provisional Application Ser. No. 62/201,015 filed Aug. 4, 2015.

FIELD OF THE INVENTION

The present invention relates to preparation of polymers and/or copolymers of vinyl type monomers that contain pendant carboxylic acid groups that are partially decarboxylated. Such polymers indicate useful dispersion properties. The polymers may be prepared under selected conditions such that the parameters of, e.g., monomer conversion, acid functionality, molecular weight, tacticity and/or copolymer composition may be adjusted to selected levels followed by decarboxylation.

BACKGROUND

The polymerization of vinyl type monomers that contain pendant carboxylic acid functionality has always presented some unique challenges. For example, U.S. Pat. No. 5,223,592 reports that the critical aspect is to provide complete neutralization of an itaconic acid type monomer prior to conducting the polymerization reaction, where complete neutralization is identified as having two moles of base neutralizer for each mole of itaconic acid. U.S. Pat. No. 5,336,744 reports that polymers of itaconic acid are formed at high conversion by an aqueous polymerization process of partially neutralized monomer solution, water, polyvalent metal ion, and initiator.

U.S. Pat. No. 3,444,143 reports on partially decarboxylated polymers and copolymers of itaconic acid where up to about 30 mole percent of carbon dioxide is evolved per molar equivalent of itaconic acid in the polymer.

SUMMARY

A partially decarboxylated polyitaconic acid homopolymer or copolymer comprising the following structure:

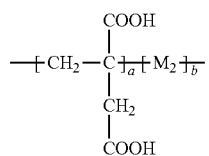

wherein one or more of the carboxylic acid groups is decarboxylated and one or more of the carboxylic acid groups are optionally in metallic salt form;

wherein the repeating unit "a" and repeating unit "b" provide that the polyitaconic acid repeating unit is present at a level of 50 wt. % to 100 wt. % and the vinyl monomer $M_2$ is present at a level of 50 wt. 5 to 0 wt. %; and wherein the level of said decarboxylation is above 30 mole % of carbon dioxide evolved per molar equivalent of itaconic acid in said polymer or copolymer based upon a maximum level of decarboxylation of 200 mole %.

A dispersion of a partially decarboxylated polyitaconic acid homopolymer or copolymer comprising the following structure:

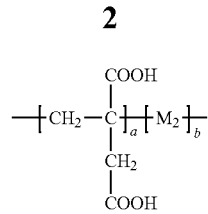

wherein one or more of the carboxylic acid groups is decarboxylated and one or more of the carboxylic acid groups are optionally in metallic salt form;

wherein the repeating unit "a" and repeating unit "b" provide that the polyitaonic acid repeating unit is present at a level of 50 wt. % to 100 wt. % and the vinyl monomer $M_2$ is present at a level of 50 wt. 5 to 0 wt. %;

wherein the level of said decarboxylation is above 30 mole % of carbon dioxide evolved per molar equivalent of itaconic acid in said polymer or copolymer based upon a maximum level of decarboxylation of 200 mole %; and wherein said partially decarboxylated homopolymer or copolymer is dispersed in solution with an inorganic mineral.

A method of treating an aqueous system for prevention of scaling comprising the step of adding to the aqueous system an amount of a partially neutralized polyitaconic acid homopolymer or copolymer which is sufficient to complex polyvalent metal ions in the aqueous system and prevent deposit formation in aqueous media, said polyitaconic acid homopolymer or copolymer comprising the following structure:

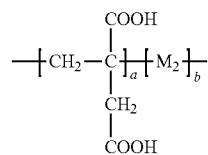

wherein one or more of the carboxylic acid groups is decarboxylated and one or more of the carboxylic acid groups are optionally in metallic salt form;

wherein the repeating unit "a" and repeating unit "b" provide that the polyitaonic acid repeating unit is present at a level of 50 wt. % to 100 wt. % and the vinyl monomer $M_2$ is present at a level of 50 wt. 5 to 0 wt. %; and wherein the level of said decarboxylation is above 30 mole % of carbon dioxide evolved per molar equivalent of itaconic acid in said polymer or copolymer based upon a maximum level of decarboxylation of 200 mole %.

A method of decarboxylating a polyitaconic acid polymer or copolymer comprising:

supplying a polyitaconic acid homopolymer or polyitaconic acid copolymer having the following structure:

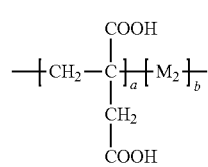

wherein the repeating unit "a" and repeating unit "b" provide that the polyitaonic acid repeating unit is present at a level of 50 wt. % to 100 wt. % and the vinyl monomer $M_2$ is present at a level of 50 wt. 5 to 0 wt. %, wherein M is a vinyl monomer capable of polymerization with itaconic acid;

wherein the polyitaconic acid repeat unit optionally includes a metallic salt of the —COOH group; and decarboxylating said polyitaconic acid homopolymer or copolymer where the level of decarboxylation is above 30 mole % of carbon dioxide evolved per molar equivalent of itaconic acid in said polymer or copolymer based upon a maximum level of decarboxylation of 200 mole %.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1:
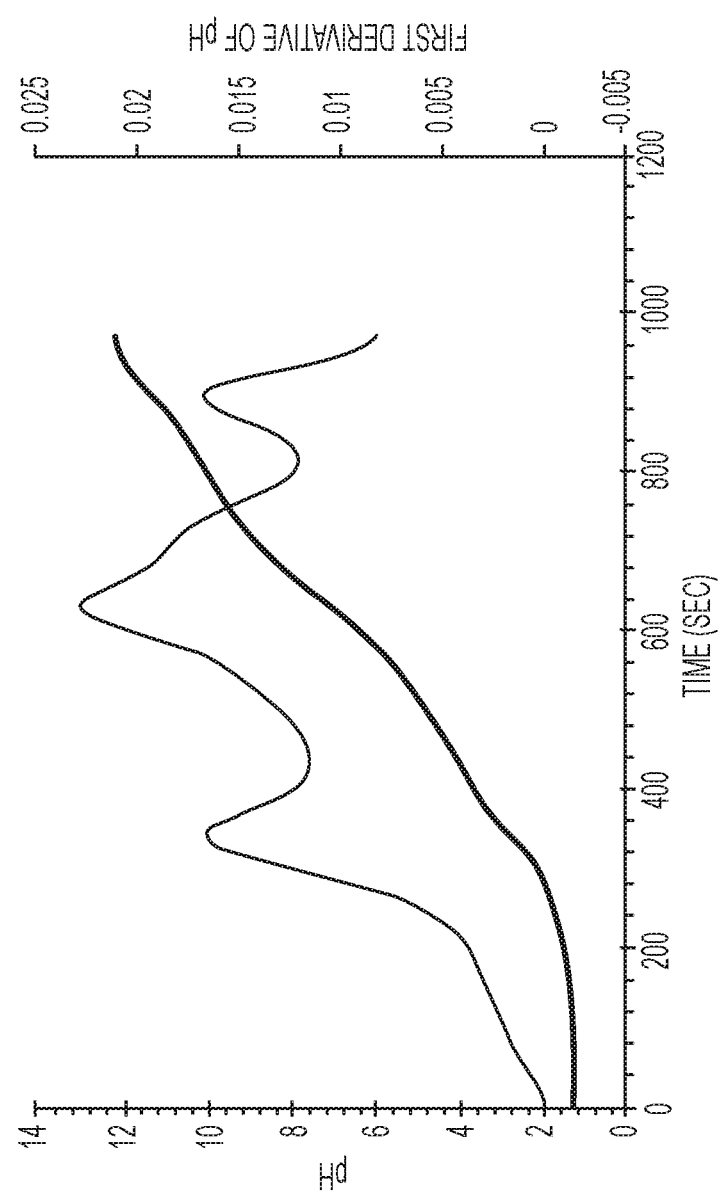
FIG. 1 is a graph of pH versus time of addition of NaOH for a non-decarboxylated polyitaconic acid polymer.

Throughout the description, like reference numerals and letters indicate corresponding structure throughout the several views. Also, any particular feature(s) of a particular exemplary embodiment may be equally applied to any other exemplary embodiment(s) of this specification as suitable. In other words, features between the various exemplary embodiments described herein are interchangeable as suitable, and not exclusive.

It may be appreciated that the present disclosure is not limited in its application to the details of construction and the arrangement of components set forth in the following description or illustrated in the drawings. The embodiments herein may be capable of other embodiments and of being practiced or of being carried out in various ways. Also, it may be appreciated that the phraseology and terminology used herein is for the purpose of description and should not be regarded as limiting. The use of "including," "comprising," or "having" and variations thereof herein is meant to encompass the items listed thereafter and equivalents thereof as well as additional items.

The monomers suitable for polymerization herein include itaconic acid having the general structure below:

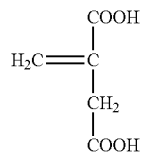

The itaconic acid may be present at a level of greater than or equal to 50 wt. % in combination with a vinylic comonomer capable of copolymerization with the itaconic acid, including but not limited to alkyl acrylates such as methyl acrylate, alkyl methacrylates such as methyl methacrylate, alkyl itaconates such as dimethyl itaconate or diethyl itaconate, maleic anhydride, styrene, acrylonitrile, vinyl halides, vinyl acetate, vinyl alcohols, vinyl acetate-vinyl alcohol mixtures, olefin monomers (ethylene and/or propylene) as well as mixtures thereof. An alkyl group may be understood to include combinations of carbon and hydrogen, including unsaturated carbon-carbon linkages, which are not prone to polymerization, such as radical polymerization.

Accordingly, the itaconic acid monomer or its corresponding salt form may be present at a level of 50 wt. % to 100 wt. % and the corresponding vinyl comonomer or comonomers may be present at a level of 50 wt. % to 0 wt. %. More preferably, the itaconic acid or corresponding salt form is present in the polymer at a level of 60 wt. % to 80 wt. %, and even more preferably at a level of 65 wt. % to 75 wt. %.

It may therefore be appreciated that the present disclosure applies initially to both homopolymers of itaconic acid and well as corresponding copolymers of the following general structure, where $M_2$ is reference to the optional incorporation of the vinyl comonomers noted herein:

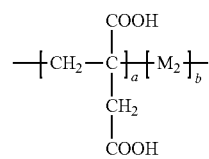

In the above, it may be appreciated that the polyitaconic acid may include the corresponding salt form of either of the two carboxylic acid groups (—COOH), such as in the formulas below:

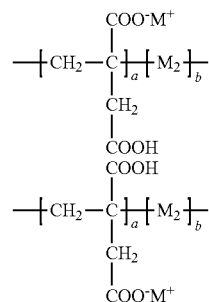

In either of the above polymer formulas, "a" is preferably at a level of 50 wt. % to 100 wt. % and the vinyl monomer $M_2$ is present such that it is at a level of 50 wt. % to 0 wt. %. $M^+$ is reference to a metal cation, such as $Na^+$ or $K+$ or $Li^+$. Again, $M_2$ is selected from any monomer capable of copolymerization with itaconic acid including but not limited to alkyl acrylates, alkyl methacrylates, alkyl itaconates, maleic anhydride, styrene, acrylonitrile, vinyl halides, vinyl acetate, vinyl alcohols, vinyl acetate-vinyl alcohol mixtures, olefin monomers as well as mixtures thereof. As described herein, such homopolymer or copolymer may be partially neutralized to remove one or more of the identified carboxylic acid groups.

Neutralization

It has been found that to provide for relatively more efficient polymerization, and in particular relatively high conversion (e.g. conversion of at or greater than 75% wt. of the monomer) the monomers herein may preferably be first neutralized under selected conditions in order to optimize the ensuing polymerization. Reference is therefore made to U.S. Pat. No. 7,910,676 whose teachings are incorporated by reference, which describes a neutralization protocol.

Neutralization may be accomplished by treatment of the acidic monomers with any base, such as monovalent inorganic bases, e.g., $M^+[OH^-]_x$ wherein M represents a cationic moiety selected from sodium, potassium, lithium and x assumes the value to provide a neutralized salt. In addition, it is contemplated herein that one may employ non-metallic hydroxides, such as ammonium hydroxide, as well as organic base compounds, including primary amines (e.g. an alkyl amine such as monomethyl amines, dimethylamines, trimethylamines, monoethylamine, diethylamine, triethylamine) and/or organic compounds containing hydroxyl (OH) group functionality (e.g. ethylene glycol).

The amount of neutralization may be adjusted to provide a less than complete neutralization of the acidic groups present on the vinyl monomers noted herein). For example, in the case of the representative monomer of itaconic acid, it may be understood that complete neutralization will require two moles of neutralizer for each mole of itaconic acid. That is, two moles of sodium hydroxide would provide complete neutralization of one mole of itaconic acid, and any amount of sodium hydroxide less than two moles would provide the desired result of partial neutralization. Those of skill in the art would recognize that when a divalent based is employed to neutralize itaconic acid, the amount of divalent base selected to completely neutralize itaconic acid would be 1.0 mole of divalent base for each mole of itaconic acid, and to partially neutralize, less than one mole of divalent base may be applied to partially neutralize the itaconic acid monomer.

It has been found that the level of neutralization herein may be preferentially maintained at about 45.0 mole % to 55.0 mole %, including all values therein, in 1.0 mole % increments. For example, for 1.0 mole of itaconic acid, one may preferably neutralize 0.45 moles of the acid groups present to 0.55 moles of the acid groups present. The level of neutralization of the itaconic acid monomer may be in the range of 45.0 mole % to 55.0 mole %.

The temperature at which partial neutralization may be achieved may also be adjusted such that neutralization is accomplished at temperatures of 50.0° C. to 150° C., including all values therein, in 1.0° C. increments. For example, it is preferable that the neutralization temperature is adjusted to be 50° C. to 110° C., and in a most preferred configuration, the neutralization temperature is adjusted to be in the range of 65° C. to 100° C.

One may partially neutralize according to the requirements noted above and allow for such partial neutralization to remain at the previously specified neutralization temperatures for a period of time up to and including 6.0 hours, including all time periods between 0.1 hours to 6.0 hours, in 0.1 hourly increments. More preferably, the neutralization time period at the previously specified temperature may be selected such that it does not exceed a time period of 2.0 hours. Finally, the neutralization time period at the previously specified temperature may be preferably selected such that it does not exceed a time period of 1.0 hours.

In addition, it may be appreciated that one may accomplish neutralization by, e.g., operating for no more than an accumulated time period of 6.0 hours at a temperature of 50° C. to 150° C., by cooling outside such temperature and time period, to otherwise limit isomerization of the reacting monomers, as discussed more fully below. For example, one may partially neutralize as noted above for a period of 0.5 hours at a temperature of 50° C. to 150° C., then cool to about 25° C. This may then be followed by heating and neutralizing for another 0.5 hours at a temperature of 50° C. to 150° C. This then would provide a preferred time and temperature of neutralization, prior to polymerization, of 1.0 hours at a temperature of 50° C. to 150° C.

Polymerization

Subsequent to neutralization, according to the use of the partial neutralization noted herein at the indicated windows of, e.g., time and temperature, polymerization may be initiated. The itaconic acid and optional comonomers noted herein may be combined in a solvent to provide a solids content of 50 wt. % to 90 wt. %, including all values therein in 1.0 wt. % increments. The solids content may more preferably be in the range of 60 wt. % to 80 wt. % or 65 wt. % to 75 wt. %. Solids content may be understood as the wt. % of monomer in the solvent that is employed.

One may then employ radical initiation, utilizing free radical initiators such as peroxides and azo compounds, such as azobisisobutyronitrile (AIBN). One may also preferably utilize water-soluble radical initiators wherein the initiators are prepared in solution by dissolving the selected initiator in deionized water or a combination of water miscible polar solvents. Water soluble initiators may include persulfate salts, such as ammonium persulfate, sodium persulfate and potassium persulfate, including mixtures thereof. Also useful as a water soluble initiator are hydrogen peroxide ($H_2O_2$), tertiobutyl hydroperoxide, and water soluble azo initiators.

The initiators may be present at the concentration of 0.05 wt. % to 15.0 wt. % of monomer present, and all values therein, at 0.05 wt. % increments. More preferably, the initiators may be present at a level of 0.10 wt. % to 6.0 wt. % of monomer present, or at a level of 0.20 wt. % to 4.0 wt. % of the monomer present. In addition, the initiators may be selected such that they have an effective temperature for a 10.0 hour half-life $(T10)_{1/2}$, or time to decrease to half of their initial concentration, of less than or equal to 100° C. In other words, preferentially, the initiators are selected such that less than half of the initiator remains present after 10 hours, at temperatures above 100° C. In this manner, it can be assured that sufficient free radicals are generated during the polymerization.

The initiator may be sequentially introduced into the polymerization solution (monomer and solvent) by introducing the herein disclosed amount of initiator over the first 75% of the time assigned for polymerization. For example, for a 3 hour polymerization period, one may introduce the initiator such that the first 50% of all initiator to be added is introduced at the start of the polymerization period, and the remaining 50% is added over the 2.25 hours. Furthermore, one may elect to add all of the desired amount of initiator at the start of the selected polymerization period. However, it may be preferred to utilize sequential addition, as this may support continuous polymerization processes.

The solution of monomer and solvent, subsequent to the neutralization procedures noted herein, may then be heated to a temperature of 50° C. to 150° C., including all values therein in 1.0° C. increments. More preferably, the polymerization temperature may be set to 70° C. to 115° C. or 80° C. to 110° C. In addition, the time for polymerization of the monomers may be from 0.1 hours to 48 hours, including all values therein, in 0.1 hour increments. More preferably, the time for polymerization may be set to a time period of 0.2 hours to 12.0 hours or 0.3 hours to 3.0 hours.

Polymer MW and Tacticity

The polymers produced herein are produced such that they preferably have weight average molecular weights (Mw) of 1500 to 50,000 and/or number average molecular weights (Mn) in the range of 800 to 10,000. More preferably, the value of Mn is in the range of 1000 to 5000. Such molecular weight values, particularly at the lower end, can be readily achieved by the optional use of chain transfer agents in the identified polymerization.

In addition, the polymers herein may be produced to have a desired level of tacticity with respect to analysis of triad structure by NMR techniques. For example, the polymers herein may be formed with the presence of syndiotactic triads, at a level of greater than 58.0%. For example, the level of syndiotactic triads as determined by NMR techniques, such as $^{13}C$ NMR, may be formed at the level of greater than 58.0% to 75.0%, including all values therein, in 1.0% increments.

With respect to the various polymerizations noted above, it is contemplated herein that the polymerizations may be suitable for a continuous polymerization process (i.e. a polymerization process that runs continuously and continuously provides polymeric material).

Decarboxylation

The present disclosure broadly relates to the partial decarboxylation of polyitaconic acid and/or the salt of polyitaconic acid, where polyitaconic acid and/or the salt are preferably present at a level of 50 wt. % or greater with respect to the optional incorporation of one or more additional vinyl type monomers. Such partially decarboxylated resin provides a material with, amongst other features, enhanced dispersion properties of inorganic minerals in solution. Inorganic minerals may be understood as including: (1) inorganic carbonates (e.g. inorganic compounds containing the anionic carbonate group $[CO_3]^{2-}$ such as $CaCO_3$ or $MgCO_3$); (2) inorganic oxides including simple oxides, hydroxides and multiple oxides (e.g., $TiO_2$, $Al_2O_3$, $Fe_2O3$); (3) inorganic sulfates (e.g. inorganic compounds containing the sulfate anion $SO_4^{2-}$ an example of which is $CaSO_4$); (4) inorganic phosphates (e.g. inorganic compounds containing the anion $PO_4^{3-}$ such as $Ca_5(PO_4)_3(OH)$; and (5) silicates (inorganic compounds that contain the $[SiO4]^{4-}$ anion. The partially decarboxylated resins are also useful due to their enhanced anti-scaling characteristics (ability to prevent unwanted material from collection on a solid surface).

On that point, given that polyitaconic acid can have two carboxylic acids groups per repeat unit, the amount of decarboxylation may therefore theoretically be 200 mole % (i.e. 200 mole % of carbon dioxide may be evolved per molar equivalent of itaconic acid in the polymer). In the present disclosure, the level of decarboxylation is controlled such that it is above 30 mole % and preferably falls in the range of 40 mole % to 150 mole % of carbon dioxide evolved per molar equivalent of itaconic acid in the polymer or copolymer.

For example, for that situation where the level of decarboxylation is less than theoretical the reaction can be represented as follows for partial decarboxylation of the acid group (—COOH) attached to the main chain:

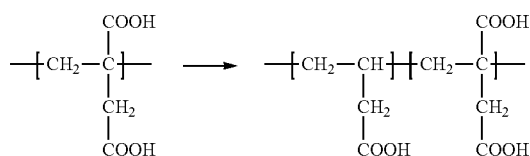

Alternatively, for partial decarboxylation of the acid group attached to the methylene ($CH_2$) group, the product of the above reaction may then be as follows:

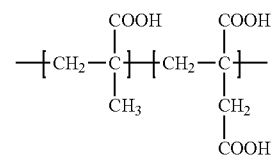

Accordingly, in the case of the optional partial decarboxylation of the polyitaconic acid copolymer noted above, the partially decarboxylated polymer may have one or more of the following structures, wherein any one or more of the carboxylic groups may be randomly removed:

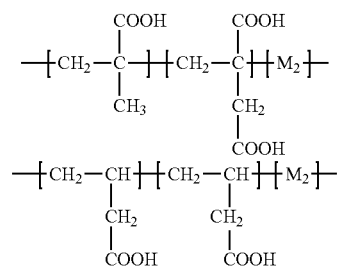

Preferably, the level of partial decarboxylation herein is configured to ultimately fall within the range of 45 mole % to 100 mole % of carbon dioxide evolved per molar equivalent of itaconic acid in the polymer or copolymer, and most preferably in the range of 50 mole % to 90 mole % of carbon dioxide evolved per molar equivalent of carbon dioxide in the polymer or copolymer.

It should also be appreciated that in the present disclosure, in the case of the neutralization protocol described herein which is preferably used for polymerization, the polymer that is formed is one that includes, e.g., the sodium salt of polyitaconic acid repeating unit, wherein preferably 45-55 mole % of the carboxylate group attached to the methylene group is exclusively in the salt form. Such salt form may optionally be converted to the free acid form by exposing the polymer to an ion exchange resin column or by addition a relatively strong acid (e.g. sulfuric acid, hydrochloric acid, etc.). However, it has been recognized herein that when the carboxylic acid group is present in such a salt form it will not undergo decarboxylation under the decarboxylation conditions employed herein. For example, in that situation where a salt of the carboxylate group is present, the partial decarboxylation reaction may proceed as follows, whereas the reaction is illustrated for the homopolymer, and would apply equally as well to the copolymer where a second monomer $M_2$, as described herein, is incorporated into the repeating unit structure:

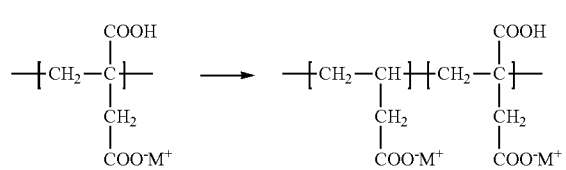

Accordingly, one may preferably start with the salt form of polyitaconic acid resulting from the polymerization protocol herein, where 45-55 mole % of the carboxylate group remains is in the form of a metal salt. Such may be illustrated by the reaction below which identifies as the starting polymer for decarboxylation a polyitaconic acid where 50 mole % of the carboxylate group is in salt form and only the carboxylate group attached to the main chain undergoes loss of carbon dioxide during decarboxylation. In such decarboxylation reaction it would also be understood that the level of decarboxylation itself is 100 mole % (i.e. of the 200 mole % of carbon dioxide that was originally available in the polyitaconic acid for decarboxylation, only 100 mole % is available due to the present of the sodium salt).

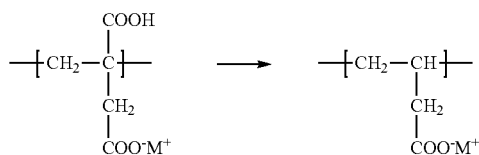

In addition, as alluded to above, for the metal salt of polyitaconic acid illustrated above, which still contains residual acid functionality (—COOH) it can be appreciated that such sodium salt may be further neutralized by addition of a base (e.g. NaOH or KOH or LiOH) to increase the level of neutralization upwards, which would then regulate the amount of decarboxylation that may ultimately be achieved. For example, a polyitaconic acid with a level of neutralization and salt formation of 50% can be increased to 80% (where less decarboxylation may occur) or even to 100% (where no decarboxylation would take place).

The decarboxylation reaction itself is preferably achieved herein by placement of the polyitaconic acid or the partially neutralized sodium salt, as either a homopolymer or copolymer, preferably into water, followed by heating in a pressure reactor. Preferably, a base is included, such as NaOH or LiOH. However, in the case of the partially neutralized polymers, residual base will be present that can then be relied upon for promoting the decarboxylation reaction. Other suitable solvents, which are preferably relatively polar and suitable to dissolve the indicated polymers, include organic alcohols (e.g., methanol or ethanol or mixtures thereof). One may also consider the use of polyethylene oxide type solvents, such as PEO at MW values of 100-500. Heating is preferably applied at temperatures of 100° C. to 200° C. in aqueous solution at concentrations of the polymer at levels of 30 to 90 wt. % solids. More preferably, the solids content in solution is maintained at 40% solids to 90% solids. Heating is preferably applied for a period of 5 minutes to 24 hours. More preferably, the temperature of decarboxylation may be 120° C. to 200° C. for a period of 5 minutes to 8 hours, or 120° C. to 150° C. for a period of 1 hour to 8 hours, or a period of 150° C. to 180° C. for a period of 5 minutes to 1 hour. Exemplary pressures that are achieved in the pressure reactor are as follows: 121° C./14 psig; 133° C./28 psig; 143° C./42 psig; 180° C./131 psig.

Determination of Decarboxylation Levels

Above 10 gr of a polymer solution at 15 wt. % solid content is prepared by diluting the polymer solution with reverse osmosis (RO) water. Accurate moisture content of this solution is recorded using a moisture analyzer scale. In a plastic beaker with a lid mix 5.0 g of the 15 wt. % polymer solution previously made, one adds 7.5 g of 1N HCl, and 50.0 g RO water. A mixing bar is placed in the beaker and the sample is placed on a stir plate. A pH probe is calibrated with standards at pH=1.00 and pH=13.00. A 20 mL syringe is filled with 1M NaOH and placed on an automatic syringe pump just over the mixing solution on the stir plate. A data logger is used to record pH as a function of time with a recording every second for 1500 seconds. Data recording and sodium hydroxide addition at the rate of 50 ml/hr through the automatic syringe pump are started at the same time. When the pH reaches about 12 the pump is stopped as well as the data collection.

FIG. 1 shows pH versus time of addition of NaOH for a non-decarboxylated polyitaonic acid. As can be seen, there are three inflection points, the first peak corresponding to the titration of excess HCl present (~pH 3.0), the second inflection point (~pH 7.0) corresponds to titration of the first carboxylic acid group attached to the methylene group, and the third inflection point (~pH 11.0) corresponds to titration of the remaining carboxylic acid group on the polymer chain.

Figure 2:
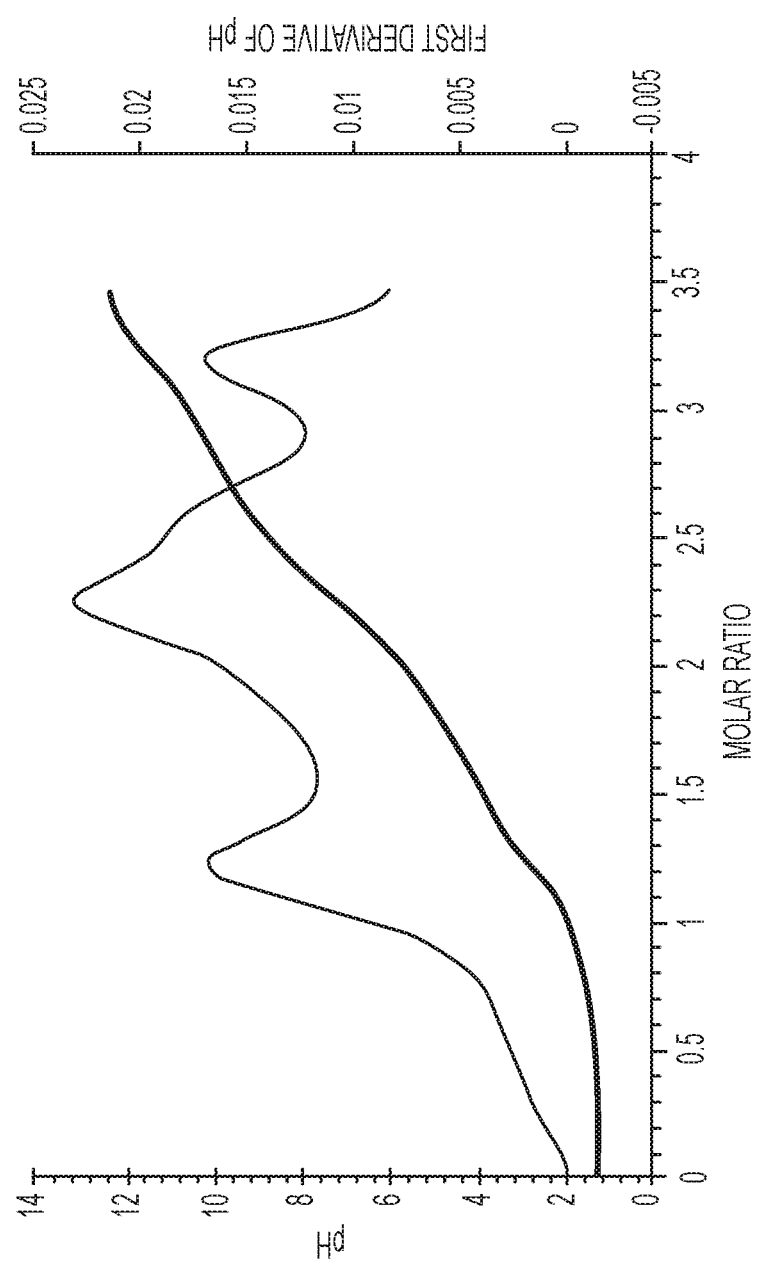
FIG. 2 is a graph of pH versus molar ratio of NaOH for a non-decarboxylated polyitaconic acid polymer.

FIG. 2 shows pH versus molar ratio of NaOH for a non-decarboxylated polyitaconic acid. It is noted that such molar ratio is obtained by the following general equation: Molar ratio=Moles NaOH/Moles of [NaIA]=time(sec)×rate (mL/sec)*[NaOH] (mol/ML)/mass PIA (gr)/[PIA] (wt. %)*Molecular weight NaIA (g/mole). As decarboxylation progresses, the mole ratio between pH 7.0 and 11.0 decreases while the mole ratio between pH 3.0 and 7.0 remain constant. The % decarboxylation=2-(mole ratio at first inflection near pH 3.0-mole ratio at last inflection point near pH11.0).

Figure 3:
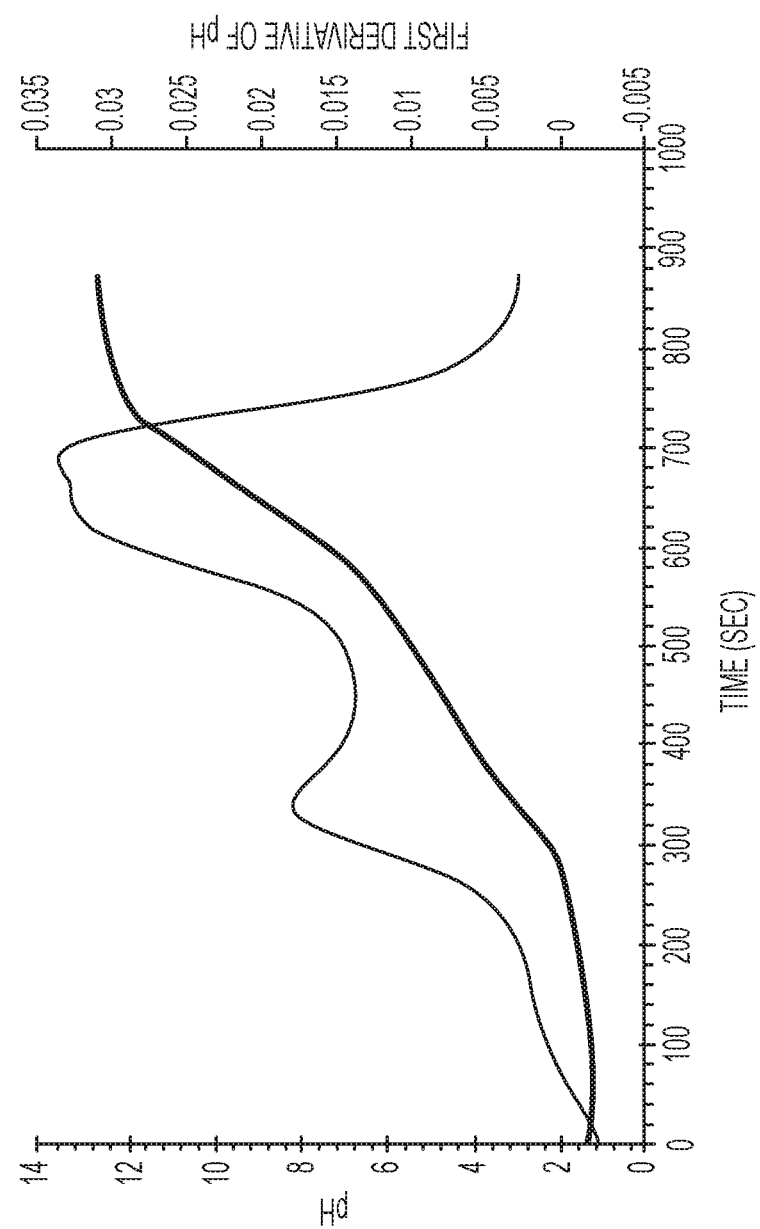
FIG. 3 is a graph of pH versus time of addition of NaOH for a partially decarboxylated polyitaconic acid polymer.
Figure 4:
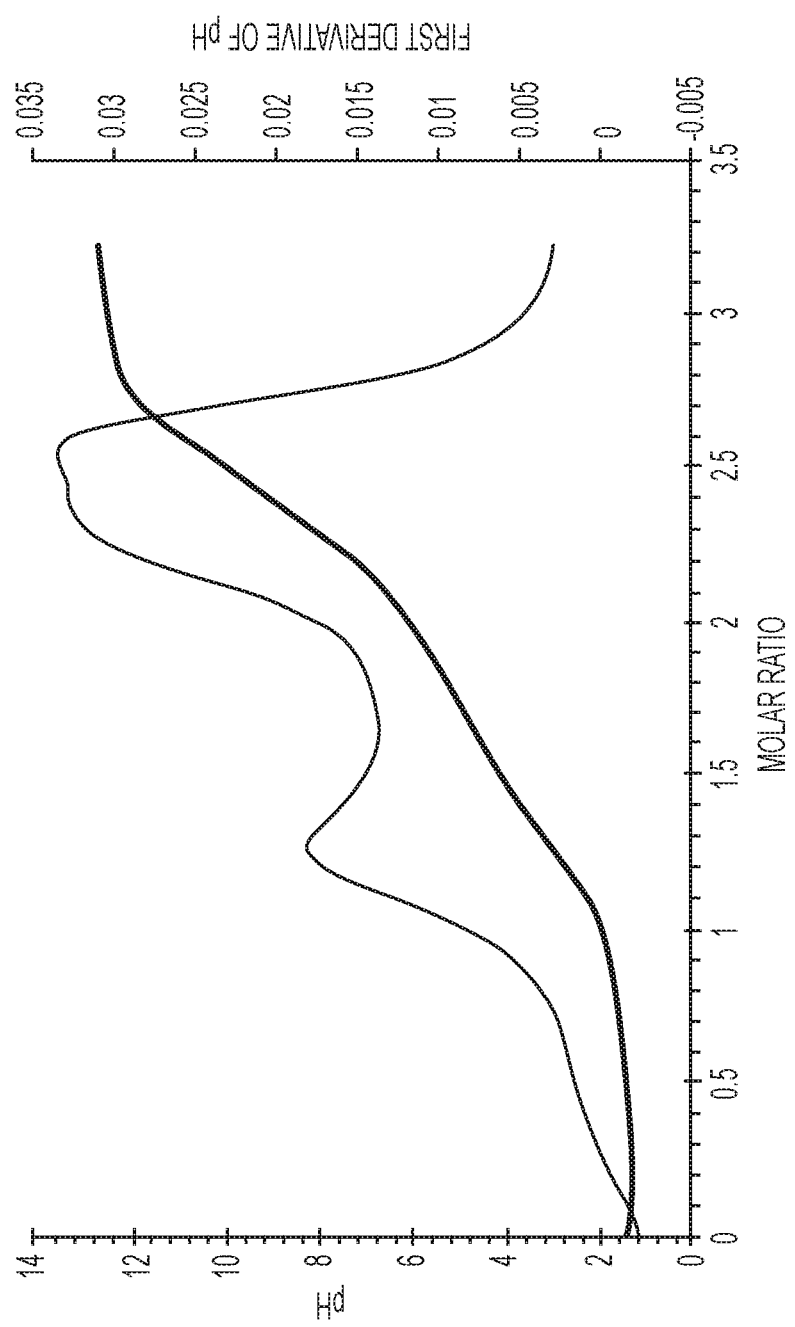
FIG. 4 is a graph of pH versus molar ratio of NaOH for a partially decarboxylated polyitaconic acid polymer.

FIG. 3 shows pH versus time of addition of NaOH for a decarboxylated polyitaconic acid. FIG. 4 shows pH versus molar ratio of NaOH where the level of decarboxylation was then determined to be 64%.

Molecular Weight Determination

Gel Permeation Chromatography (GPC) was used to determine molecular weights. The GPC is first equilibrated with the eluent (1.67% sodium nitrate in HPLC-grade water) through three TOSOH Bioscience 08026 GPC columns for approximately one hour. A refractive index detector (RID) is used to measure signal concentration. The RID is purged for 20 minutes before sample analysis is started. The following instrument conditions are used: Eluent: 1.67 wt % sodium nitrate in HPLC-grade water with inline degasser; Flow Rate: 1.0 mL/min; Run Time: 45 min; Injection volume: 100 μL Draw/Eject Speed: 200 μL/min; RID Optics Temperature: 40° C.; Automatic Purge: 1 min; Column Temperature: 35° C.

A 1 wt. % polymer solution is prepared using the GPC eluent solution as solvent. This solution is filtered with a 0.2 μM syringe-tip filter into a 2 mL HPLC vial which is then crimped closed. The vial is placed into the GPC autosampler and the chromatographic run is initiated. Molecular weight calibration was done using 6 polyacrylic acid standards with molecular weights ranging from 1000 g/mole to 1,360,000 g/mole, and with itaconic acid (monomer molecular weights 130). The 7 standards are used to create a 3rd order polynomial correlation between peak elution time and molecular weights. Each unknown sample is evaluated using this calibration function.

Conversion was calculated by the relative area of the residual monomer peak (with the longest elution time) over the total (polymer+monomer) area. Conversion is expressed as a weight percentage.

Determination of Viscosity in Slurries.

Slurry solutions are prepared by dispersion of the mineral in water using a high shear mixer for 15 minutes. For high mineral content slurries, the powders are added progressively to allow time for the powder to be wetted and fully dispersed. Dispersants are added in the form of a solution at 30 wt. %, in RO water, with pH adjusted to 8.5+/−0.1 using sodium hydroxide 50 wt. %. The slurry samples are dispersed a second time for 15 minutes using a high shear mixer. Samples are left idle for 1 hour, and then viscosity is measured with a Brookfield DV-I+ viscometer at 100 RPM. The viscometer spindle is left spinning for 1 minute before recording the viscosity.

Determination of Particle Size

A dynamic light scattering instrument was used to report particle size, model Nanotrac Ultra made by Microtrac. Volume average diameters are reported as Dv and number average diameters are reported as Dn.

Determination of Scale Inhibition

The NACE International TM0374-2007 protocol was followed. This protocol involves preparing solution of calcium with carbonate or sulfate in the presence of 1 ppm of polymer inhibitor. After 24 hours at 70 C, scale is observed at the bottom of the samples, and free calcium is quantified. Determination of free calcium was used with an EDTA complexation method using a standard titration kit made by HACH model HAC-DT "Hardness total and calcium". In this titration, hydroxy napthanol blue in basic conditions turns from pink in the presence of calcium to blue when all free calcium is complexed by EDTA. Reference samples are prepared with no inhibitors to allow 100% scale formation. Scale inhibition is reported as a % of scale, by measuring the ratio of free calcium in inhibited solutions over free calcium in a non-inhibited reference.

Moisture Content

A moisture scale analyzer is used. It records weight as function of time, while maintaining the sample at 110° C. using an infrared heater. When a constant weight is recorded for 30 seconds, the test is completed and the weight recorded as a percent decrease from the initial weight. All moisture contents are expressed as weight percent.

Determination of pH for all Examples.

All pHs are reported in solutions at 10 wt % in RO water at room temperature. The pH probe is a Tris-Compatible flat sensor. The pH meter is calibrated using pH4 and pH=7 standard solutions prior to any measurement reading.

EXAMPLES

Example 1

A sample of commercial poly(sodium itaconate), tradename Itaconix® DSP 2K®, with a Mn=2022 g/mole Mw=4158 g/mole, monomer to polymer conversion greater than 98 wt %, a pH of 5.5 and a moisture content of 16.9% was used as starting polymer. 900 gr of this polymer was dissolved in 600 gr of water at 40° C. using mild mechanical steering. The solution was placed in a pressure reactor and heated to 125° C. for 2 hours. The resulting polymer had a dark orange color, and remained in solution upon cooling. Resulting polymer solution had a 52.5% moisture content, a pH of 6.1. Acid number determination showed 70 mole % decarboxylation. No noticeable change of molecular weight was measured.

Example 2

The same Itaconix® DSP 2K® used in example 1 was used as starting polymer. 72.3 gr of this polymer was dissolved in 77.7 gr of water at 40° C. using mild mechanical steering. The solution was placed in a pressure reactor and heated to 180° C. for 30 minutes. The resulting polymer had a brown color, and remained in solution upon cooling. Resulting polymer solution had a 67.2% moisture content, a pH of 6.15. Acid number determination showed 83 mole % decarboxylation. No noticeable change of molecular weight was measured.

Example 3

A sample of commercial poly(sodium itaconate), tradename Itaconix® DSP 2K®, with a Mn=1900 g/mole Mw=3826 g/mole, monomer to polymer conversion of 97 wt %, a pH of 5.3 and a moisture content of 17% was used as starting polymer. 4.5 Kg of this polymer was dissolved in 15.5 Kg of water at 40° C. using mild mechanical steering. The solution was placed in a pressure reactor and heated to 200° C. for 10 minutes. The resulting polymer had a dark brown color, and remained in solution upon cooling. Resulting polymer solution had a 78.5% moisture content, a pH of 6.3. Acid number determination showed 90 mole % decarboxylation. No noticeable change of molecular weight was measured.

Example 4

A sample of commercial poly(sodium itaconate), tradename Itaconix® DSP 1K®, with a Mn=1312 g/mole Mw=2306 g/mole, monomer to polymer conversion greater than 98 wt %, a pH of 5.0 and a moisture content of 14.8% was used as starting polymer. 2250 gr of this polymer was dissolved in 2250 gr of water at 40° C. using mild mechanical steering. The solution was placed in a pressure reactor and heated to 125° C. for 2 hours. The resulting polymer had an orange color, and remained in solution upon cooling. Resulting polymer solution had a 58.5% moisture content, a pH of 5.4. Acid number determination showed 50 mole % decarboxylation. No noticeable change of molecular weight was measured.

Example 5

A sample of commercial poly(sodium itaconate), tradename Itaconix® DSP 2K®, with a Mn=1890 g/mole Mw=3710 g/mole, monomer to polymer conversion greater than 95 wt %, a pH of 5.2 and a moisture content of 17.5% was used as starting polymer. 1164 gr of this polymer was dissolved in 1900 gr of water at 40° C. using mild mechanical steering. The solution was placed in a pressure reactor and heated to 125° C. for 2 hours. The resulting polymer had an orange color, and remained in solution upon cooling. Resulting polymer solution had a 71.2% moisture content, a pH of 5.8. Acid number determination showed 51 mole % decarboxylation. No noticeable change of molecular weight was measured.

Example 6

A sample of commercial poly(sodium itaconate), tradename Itaconix® DSP 2K®, with a Mn=2030 g/mole Mw=4250 g/mole, monomer to polymer conversion greater than 94 wt %, a pH of 5.2 and a moisture content of 17.0% was used as starting polymer. 1687 gr of this polymer was dissolved in 1813 gr of water at 40° C. using mild mechanical steering. The solution was placed in a pressure reactor and heated to 125° C. for 7 hours. The resulting polymer had a brown color, and remained in solution upon cooling. Resulting polymer solution had a 62% moisture content, a pH of 5.7. Acid number determination showed 81 mole % decarboxylation. No noticeable change of molecular weight was measured.

Example 7

The same Itaconix® DSP 2K® used in example 6 was used as starting polymer. 1687 gr of this polymer was dissolved in 1813 gr of water at 40° C. using mild mechanical steering. The solution was placed in a pressure reactor and heated to 125° C. for 4 hours. The resulting polymer had an orange color, and remained in solution upon cooling. Resulting polymer solution had a 66.2% moisture content, a pH of 5.9. Acid number determination showed 40 mole % decarboxylation. No noticeable change of molecular weight was measured.

Example 8

A sample of commercial poly(sodium itaconate), tradename Itaconix® DSP 5K™, with a Mn=4031 g/mole Mw=11451 g/mole, monomer to polymer conversion of 98 wt %, a pH of 5.4 and a moisture content of 16.4% was used as starting polymer. 1687 gr of this polymer was dissolved in 1813 gr of water at 40° C. using mild mechanical steering. The solution was placed in a pressure reactor and heated to 125° C. for 7 hours. The resulting polymer had an brown color, and remained in solution upon cooling. Resulting polymer solution had a 61.5% moisture content, a pH of 6.3. Acid number determination showed 72 mole % decarboxylation. No noticeable change of molecular weight was measured.

Example 9

A sample of commercial poly(sodium itaconate), tradename Itaconix® DSP 1K®, with a Mn=1312 g/mole Mw=2306 g/mole, monomer to polymer conversion greater than 98 wt %, a pH of 4.9 and a moisture content of 14.8% was used as starting polymer. 1680 gr of this polymer was dissolved in 1820 gr of water at 40° C. using mild mechanical steering. The solution was placed in a pressure reactor and heated to 125° C. for 7 hours. The resulting polymer had a brown color, and remained in solution upon cooling. Resulting polymer solution had a 61.6% moisture content, a pH of 5.4. Acid number determination showed 65 mole % decarboxylation. No noticeable change of molecular weight was measured.

Performance Measurements

Calcium Carbonate Slurries

A ground calcium carbonate powder free of dispersant was used. It was prepared into several slurries with 54.0; 52.6 and 80.0 wt. % solid content respectively using a high shear mixer. Reference slurries were also prepared using polyacrylic acid (PAA2000) with a molecular weight (weight average) average of 2000 g/mole and a polyacrylic acid (PAA4000) with a molecular weight (weight average) of 4000 g/mole.

Three separate sets of experiments are reported in Table 1, 2 and 3.

TABLE 1

Viscosity of Calcium Carbonate Slurries At 54 wt. %

| Polymer sample | Polymer concentration (wt. %) | Viscosity (cP) |
|---|---|---|
| 1 | 0.4 | 21.4 |
| 2 | 0.4 | 20.6 |
| 4 | 0.4 | 58.3 |
| PAA2000 | 0.4 | 117 |
| 1 | 0.2 | 588 |
| PAA2000 | 0.2 | 2300 |

TABLE 2

Viscosity of Calcium Carbonate Slurries At 52.6 wt. %

| Polymer sample | Polymer concentration (wt. %) | Viscosity (cP) | Dv (nm) | Dn (nm) |
|---|---|---|---|---|
| 6 | 0.4 | 24.9 | 490 | 397 |
| 7 | 0.4 | 23.7 | 499 | 392 |
| 8 | 0.4 | 17.4 | 533 | 491 |
| PAA4000 | 0.4 | 90 | 497 | 435 |
| 9 | 0.2 | 110 | 601 | 475 |
| PAA4000 | 0.2 | 159 | 517 | 475 |

TABLE 3

Viscosity of Calcium Carbonate Slurries At 80 wt. %

| Polymer sample | Polymer concentration (wt. %) | Viscosity (cP) |
|---|---|---|
| 1 | 0.3 | 500 |
| PAA2000 | 0.3 | 720 |

Titanium Dioxide Slurries

A titanium dioxide powder free of dispersant was used. It was prepared into slurries with 40.0 wt. % solid content using a high shear mixer. Reference slurries were also prepared using polyacrylic acid (PAA2000) with a molecular weight (weight average) average of 2000 g/mole. Viscosities measured with different amount of polymer dispersant are reported in Table 4.

TABLE 4

Viscosity of Titanium Dioxide Slurries At 40 wt. %

| Polymer sample | Polymer concentration (wt. %) | Viscosity (cP) |
|---|---|---|
| 1 | 0.3 | 468 |
| 6 | 0.3 | 3840 |
| PAA2000 | 0.3 | 5900 |
| 1 | 0.5 | 288 |
| 6 | 0.5 | 930 |
| PAA2000 | 0.5 | 8600 |

As can be seen from the above, in the case of the partially neutralized polyitaconic acid polymers herein in the identified dispersions, the level of polymer concentration in the dispersions may be in the range of 0.1-1.0 wt % and more preferably 0.1-0.5 wt. %.

Calcium Carbonate Inhibition

Calcium carbonate scale inhibition was measured by generated solution saturated in calcium chloride and bicarbonate in the presence of $CO_2$, in the presence of 1 ppm of polymer inhibitor. Three separate set of tests are reported in Table 5.

TABLE 5

Calcium Carbonate Scale Inhibition

| Polymer sample | Test # | Scale inhibition % |
|---|---|---|
| 3 | 1 | 19.7 |
| PAA4000 | 1 | 14 |
| 9 | 2 | 48 |
| PAA4000 | 2 | 31 |
| 9 | 3 | 24 |
| PAA4000 | 3 | 14 |

Calcium Sulfate Inhibition

Calcium sulfate scale inhibition was measured by generated solution saturated in calcium chloride and sodium sulfate, in the presence of 1 ppm of polymer inhibitor. Scale inhibition greater than 100% is due to the blank control free of sulfate and apparently reporting some background calcium levels. It can be interpreted as method error.

TABLE 6

Calcium Sulfate Scale Inhibition

| Polymer sample | Scale inhibition % |
|---|---|
| 5 | 102 |
| 3 | 90 |
| PAA4000 | 107 |

As can initially be seen from the above, the scale inhibition that may be achieved with the partially decarboxylated polyitaconic acid homopolymer or copolymers is optimized where the level of polymer in solution subject to scaling may be in the range of 1-50 ppm, more preferably. In addition, for preferred anti-scaling performance, the level of decarboxylation is in the range of 70 mole % to 90 mole % of carbon dioxide per molar equivalent of itaconic acid and at a number average molecular weight in the range of 800 to 2000.

Accordingly, the partially decaboxylated polyitaconic acid hompolymers or copolymers herein are remarkably suitable for prevention of scaling and include the step of adding to a given aqueous system an amount of the partially neutralized polyitaconic acid homopolymer or copolymer which is sufficient to complex polyvalent metal ions in the aqueous system and prevent deposit formation in aqueous media. The polyvalent metal ions may therefore include $Ca^{+2}$, $Ba^{+2}$, $Cr^{+2}$, $Cr^{+3}$, $Cu^{+2}$, $Fe^{+2}$, $Fe^{+3}$, $Pb^{+2}$, $Mg^{+2}$, $Mn^{+2}$, $Mn^{+3}$, $Hg^{+2}$, $Sn^{+2}$, $Sn^{+4}$, $Sr^{+2}$, $Zn^{+3}$. Preferably the complexation herein is directed at complex polyvalent ions of $Ca^{+2}$, $Mg^{+2}$ and $Ba^{+2}$ and $Sr^{+2}$. Such metals may therefore be present as e.g., metal carbonates ($CO_3^{2-}$), metal sulfates ($SO_4^{2-}$), metal sulfites ($SO_3^{2-}$), or metal thiosulfites ($S_2O_3^{2-}$).

Applications of the above for the prevention of scaling may therefore apply to and include, but not be limited to, pipes, boilers, oil and gas exploration (downhole drilling systems), water cooling systems, water purification systems (e.g., reverse osmosis systems), distillation systems and laundry systems.

It may also be noted that the conventional expectation was that decarboxylation would reduce dispersant properties and increase chelating ability. As can now be seen, the partially decarboxylated polyitaconic acid homopolymer and/or copolymers herein are such that partial decarboxylation, particularly at levels over 30 mole % of carbon dioxide per molar equivalent of itaconic acid in the polymer, improves dispersion capability and scale inhibition characteristics. Polymers of itaconic acid are currently marketed for their high chelation capacity, particularly for the chelation of hard ions, such as calcium and magnesium. Because of the strong chelation properties, they have been otherwise considered a relatively poor choice for scale inhibition and dispersants. As strong chelants, polyitaconic acid will relatively rapidly complex with soluble divalent metal ions such as calcium, and become saturated and unavailable to provide inhibition and dispersant properties. The polyitacoic acid homopolymers and copolymer herein, when partially decarboxylated, appear to now loose a relatively significant amount of their chelation capacity, particularly between 40 mole % to 150 mole % of carbon dioxide per molar equivalent of itaconic acid in the polymer.

The foregoing description of several methods and embodiments has been presented for purposes of illustration. It is not intended to be exhaustive and obviously many modifications and variations are possible in light of the above teaching.

What is claimed is:

1. A partially decarboxylated polyitaconic acid homopolymer or copolymer comprising the following structure:

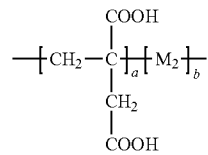

wherein one or more of the carboxylic acid groups is decarboxylated and one or more of the carboxylic acid groups are optionally in metallic salt form;

wherein the polyitaconic repeating unit "a" is present at a level of 50 wt. % to 100 wt. % and $M_2$ is a polymerized vinyl containing monomer and repeating unit "b" containing said polymerized vinyl containing monomer is present at a level of 50 wt. % to 0 wt. %;

wherein the level of said decarboxylation is at or above 40 mole % of carbon dioxide evolved per molar equivalent of itaconic acid in said polymer or copolymer based upon a maximum level of decarboxylation of 200 mole %.

2. The partially decarboxylated polyitaconic acid homopolymer or copolymer of claim 1 wherein the level of decarboxylation is in the range of 40 mole % to 150 mole %.

3. The partially decarboxylated polyitaconic acid homopolymer or copolymer of claim 1 wherein the level of decarboxylation is in the range of 50 mole % to 90 mole %.

4. The partially decarboxylated polyitaconic acid homopolymer or copolymer of claim 1 wherein the polyitaconic acid homopolymer or copolymer has a number average molecular weight (Mn) value of 800 to 10,000 or a weight average molecular weight (Mw) of 1,500 to 50,000.

5. The partially decarboxylated polyitaconic acid homopolymer or copolymer of claim 1 wherein 45 mole % to 55 mole % of the carboxylic acid groups (—COOH) are in salt form (—COO$^-$M$^+$) where M$^+$ is a metal cation.

6. The partially decarboxylated polyitaconic acid homopolymer or copolymer of claim 1 wherein $M_2$ is selected from the group consisting of alkyl acrylates, alkyl methacrylates, alkyl itaconates, maleic anhydride, styrene, acrylonitrile, vinyl halides, vinyl acetate, vinyl alcohols, vinyl acetate-vinyl alcohol mixtures, olefin monomers, and mixtures thereof.

7. The partially decarboxylated polyitaconic acid homopolymer or copolymer of claim 1 wherein said partially decarboxylated homopolymer or copolymer has the following structure:

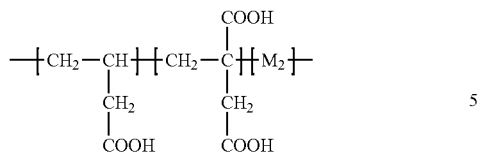

8. The partially decarboxylated polyitaconic acid homopolymer or copolymer of claim 1 wherein said partially decarboxylated homopolymer or copolymer has the following structure:

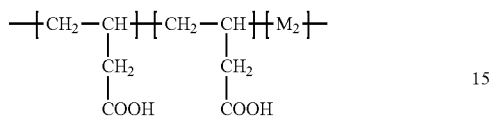

9. The partially decarboxylated polyitaconic acid homopolymer or copolymer of claim 1 wherein said partially decarboxylated homopolymer or copolymer has the following structure:

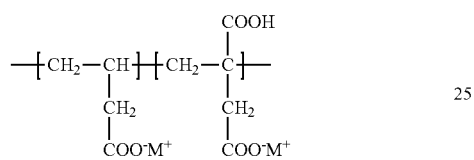

where M+ is a metal cation.

* * * * *